US008526133B2

(12) United States Patent
Xia et al.

(10) Patent No.: US 8,526,133 B2
(45) Date of Patent: Sep. 3, 2013

(54) SYSTEMS AND METHODS FOR USER DATA BASED FLY HEIGHT CALCULATION

(75) Inventors: Haitao Xia, San Jose, CA (US); George Mathew, San Jose, CA (US); Ming Jin, Fremont, CA (US); Shaohua Yang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 232 days.

(21) Appl. No.: 13/185,562

(22) Filed: Jul. 19, 2011

(65) Prior Publication Data
US 2013/0021690 A1    Jan. 24, 2013

(51) Int. Cl.
*G11B 21/02*    (2006.01)
(52) U.S. Cl.
USPC ............... 360/75; 360/55; 360/78.12; 360/31
(58) Field of Classification Search
None
See application file for complete search history.

(56) References Cited

U.S. PATENT DOCUMENTS

| 4,715,257 | A | 12/1987 | Endo et al. |
| 4,777,544 | A | 10/1988 | Brown et al. |
| 5,086,475 | A | 2/1992 | Kageyama et al. |
| 5,111,727 | A | 5/1992 | Rossum |
| 5,377,058 | A | 12/1994 | Good et al. |
| 5,814,750 | A | 9/1998 | Read et al. |
| 6,097,559 | A | 8/2000 | Ottensen |
| 6,191,901 | B1 | 2/2001 | Carlson |
| 6,519,102 | B1 | 2/2003 | Smith et al. |
| 6,937,424 | B2 | 8/2005 | Chang et al. |
| 7,038,875 | B2 | 5/2006 | Lou et al. |
| 7,158,325 | B1 | 1/2007 | Hu et al. |
| 7,518,820 | B1 * | 4/2009 | Wu et al. ........................ 360/75 |
| 8,325,432 | B2 * | 12/2012 | Mathew et al. ................ 360/31 |
| 2004/0093554 | A1 | 5/2004 | Hung |
| 2005/0046982 | A1 | 3/2005 | Liu et al. |
| 2007/0211368 | A1 * | 9/2007 | Shibano et al. ................ 360/75 |
| 2007/0268615 | A1 | 11/2007 | McFadyen et al. |
| 2008/0018786 | A1 | 1/2008 | Kageyama et al. |
| 2009/0299666 | A1 | 12/2009 | Kang et al. |

FOREIGN PATENT DOCUMENTS

| EP | 2031759 | 3/2004 |
| WO | WO 02/093546 | 11/2002 |
| WO | WO 2010/014078 | 2/2010 |

OTHER PUBLICATIONS

U.S. Appl. No. 12/669,483, filed Aug. 12, 2010, Graef, Nils.
U.S. Appl. No. 12/851,425, filed Aug. 5, 2010, Mathew et al.
U.S. Appl. No. 12/851,455, filed Aug. 5, 2010, Mathew et al.
U.S. Appl. No. 12/856,782, filed Aug. 16, 2010, Mathew et al.
U.S. Appl. No. 12/875,734, filed Sep. 3, 2010, Mathew et al.
Fertner, Antoni "Frequency-Domain Echo Canceller With Phase Adjustment" IEEE Transactions on circuits and Systems—II; Analog and Digital Signal Processing, V. 44, No. 10, 10/9.
Liu, et al., "Head Disk Spacing Variation Suppression via Active Flying Height Control" IEEE Instrumentation and Measurement Technology Conf. Budapest, Hungary May 21-23, 2001.

* cited by examiner

*Primary Examiner* — Muhammad N Edun
(74) *Attorney, Agent, or Firm* — Hamilton DeSanctis & Cha

(57) ABSTRACT

Various embodiments of the present invention provide systems and methods for calculating and/or modifying fly height. For example, a circuit for calculating fly height is disclosed that includes: a first pattern detector circuit, a second pattern detector circuit, a first pattern fly height calculation circuit, a second pattern fly height calculation circuit, a first averaging circuit, a second averaging circuit, and a combining circuit.

20 Claims, 5 Drawing Sheets

SYSTEMS AND METHODS FOR USER DATA BASED FLY HEIGHT CALCULATION

BACKGROUND OF THE INVENTION

The present invention is related to systems and methods for transferring information to and from a storage medium, and more particularly to systems and methods for positioning a sensor in relation to a storage medium.

Various storage media are accessed through use of a read/write head assembly that is positioned in relation to the given storage medium. The read/write head assembly is supported by a head actuator, and is operable to read or sense information from the storage medium and to write information to the storage medium. The distance between the read/write head assembly and the storage medium is typically referred to as the fly height. Control of the fly height is critical to proper operation of a storage system in which the storage medium is deployed. In particular, increasing the distance between the read/write head assembly and the storage medium typically results in an increase in inter symbol interference. Where inter symbol interference becomes unacceptably high, it may become impossible to credibly read the information originally written to the storage medium. In contrast, a fly height that is too small can result in excess wear on the read/write head assembly and/or a premature crash of the storage device.

In a typical storage device, fly height is set to operate in a predetermined range. During operation, the fly height is periodically measured to assure that it continues to operate in the predetermined region. A variety of approaches for measuring fly height have been developed including optical interference, spectrum analysis of a read signal wave form, and measuring a pulse width value of the read signal. Such approaches in general provide a reasonable estimate of fly height, however, they are susceptible to various errors. In some cases, fly height has been measured by utilizing harmonic measurements based upon periodic data patterns written to the user data regions of a storage medium. Such approaches are problematic as they reduce the amount of storage that may be maintained on a given storage medium. In other cases, fly height has been measured during operation using servo data that occurs periodically on a given storage medium. While such an approach addresses some of the previously mentioned limitations, updates can be very slow and at times accuracy can suffer.

Hence, for at least the aforementioned reasons, there exists a need in the art for advanced systems and methods for positioning a sensor in relation to a storage medium.

BRIEF SUMMARY OF THE INVENTION

The present invention is related to systems and methods for transferring information to and from a storage medium, and more particularly to systems and methods for positioning a sensor in relation to a storage medium.

Various embodiments of the present invention provide circuits for calculating a fly height value. Such circuits include a first pattern detector circuit, a second pattern detector circuit, a first pattern fly height calculation circuit, a second pattern fly height calculation circuit, a first averaging circuit, a second averaging circuit, and a combining circuit. The first pattern detector circuit is operable to identify a first pattern in a received data set. The received data set corresponds to user data disposed between a first servo data region and a second servo data region. The first pattern fly height calculation circuit is operable to calculate a first fly height using data values corresponding to the first pattern to yield a first pattern fly height output, and the first averaging circuit is operable to average the first pattern fly height output with other instances of the first fly height output to yield a first averaged output. The second pattern detector circuit is operable to identify a second pattern in the received data set. The second pattern fly height calculation circuit is operable to calculate a second fly height using data values corresponding to the second pattern to yield a second pattern fly height output, and the second averaging circuit is operable to average the second pattern fly height output with other instances of the second pattern fly height output to yield a second averaged output. The combining circuit is operable to combine at least the first averaged output and the second averaged output to yield a composite fly height value. In particular cases, the circuit is implemented as part of an integrated circuit, while in other cases the circuit is implemented as part of a storage device. In one particular case, the first pattern is a sync pattern, and wherein the second pattern is an end of sector pattern.

In some instances of the aforementioned embodiments, both the first and second patterns are periodic patterns. In various instances of the aforementioned embodiments, the first and second patterns may be, but are not limited to, a sync mark pattern, a preamble pattern, an end of sector pattern, and/or a predetermined pattern within a user data region. In one or more instances of the aforementioned embodiments, the combining circuit is operable to normalize the at least the first averaged output and the second averaged output to one. In other instances, the combining circuit is operable to: multiply the first averaged output by a first weighting factor to yield a first weighted value; multiply the second averaged output by a second weighting factor to yield a second weighted value; and a sum at least the first weighted value and the second weighted value to yield the composite fly height value.

In various instances of the aforementioned embodiments, the circuit further includes: a preamble pattern detector circuit operable to identify a preamble pattern in the received data set; a third pattern fly height calculation circuit operable to calculate a third fly height using data values corresponding to the preamble pattern to yield a third pattern fly height output; and a third averaging circuit operable to average the third pattern fly height output with other instances of the third fly height output to yield a third averaged output. In such instances, the combining circuit is further operable to combine at least the first averaged output, the second averaged output, and the third averaged output to yield the composite fly height value.

In some instances of the aforementioned embodiments, the circuit further includes: a predetermined pattern within a user data region detector circuit operable to identify a predetermined pattern in the received data set; a third pattern fly height calculation circuit operable to calculate a third fly height using data values corresponding to the predetermined pattern to yield a third pattern fly height output; and a third averaging circuit operable to average the third pattern fly height output with other instances of the third fly height output to yield a third averaged output. In such instances, the combining circuit is further operable to combine at least the first averaged output, the second averaged output, and the third averaged output to yield the composite fly height value. In some such cases, the circuit further includes a programmed user data memory operable to receive and store the predetermined pattern.

Yet other embodiments of the present invention provide methods for fly height modification. Such methods include: receiving a data set derived from a storage medium via a head assembly; identifying a first pattern in the received data set;

calculating a first fly height using data values corresponding to the first pattern to yield a first pattern fly height output; averaging the first pattern fly height output with other instances of the first fly height output to yield a first averaged output; identifying a second pattern in the received data set; calculating a second fly height using data values corresponding to the second pattern to yield a second pattern fly height output; averaging the second pattern fly height output with other instances of the second fly height output to yield a second averaged output; combining at least the first averaged output and the second averaged output to yield a composite fly height value; and modifying a distance between the head assembly and the storage medium based at least in part on the composite fly height value. In such embodiments, the data set corresponds to user data disposed between a first servo data region and a second servo data region. In various instances of the aforementioned embodiments, the first pattern is one of: a sync mark pattern, a preamble pattern, an end of sector pattern, or a predetermined pattern within a user data region; and the second pattern is another of: a sync mark pattern, a preamble pattern, an end of sector pattern, or a predetermined pattern within a user data region.

In some instances of the aforementioned embodiments, combining the at least the first averaged output and the second averaged output to yield the composite fly height value includes normalizing the at least the first averaged output and the second averaged output to one. In various instances of the aforementioned embodiments, wherein combining the at least the first averaged output and the second averaged output to yield the composite fly height value includes: multiplying the first averaged output by a first weighting factor to yield a first weighted value; multiplying the second averaged output by a second weighting factor to yield a second weighted value; and summing at least the first weighted value and the second weighted value to yield the composite fly height value. In some cases, modifying the distance between the head assembly and the storage medium based at least in part on the composite fly height value is done after processing each sector of user data.

Yet other embodiments of the present invention provide a storage device. Such storage devices include: a storage medium including a first servo data region, a second servo data region, and a user data region disposed between the first servo data region and the second servo data region; and a read/write head assembly disposed in relation to the storage medium. The read/write head assembly is operable to provide an electrical signal corresponding to the user data region. The storage device further includes: an analog to digital converter circuit operable to convert a derivative of the electrical signal to a data set corresponding to the user data region; a first pattern detector circuit operable to identify a first pattern in the data set; a first pattern fly height calculation circuit operable to calculate a first fly height using data values corresponding to the first pattern to yield a first pattern fly height output; a first averaging circuit operable to average the first pattern fly height output with other instances of the first fly height output to yield a first averaged output; a second pattern detector circuit operable to identify a second pattern in the received data set; a second pattern fly height calculation circuit operable to calculate a second fly height using data values corresponding to the second pattern to yield a second pattern fly height output; a second averaging circuit operable to average the second pattern fly height output with other instances of the second pattern fly height output to yield a second averaged output; a combining circuit operable to combine at least the first averaged output and the second averaged output to yield a composite fly height value; and a fly height adjustment circuit operable to modify a distance between the read/write head assembly and the storage medium based at least in part on the composite fly height value.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 5b is a cross sectional view showing the relationship between the disk platter and the read/write head assembly of the storage device of FIG. 4a.

DETAILED DESCRIPTION OF THE INVENTION

The present invention is related to systems and methods for transferring information to and from a storage medium, and more particularly to systems and methods for positioning a sensor in relation to a storage medium.

Figure 1:
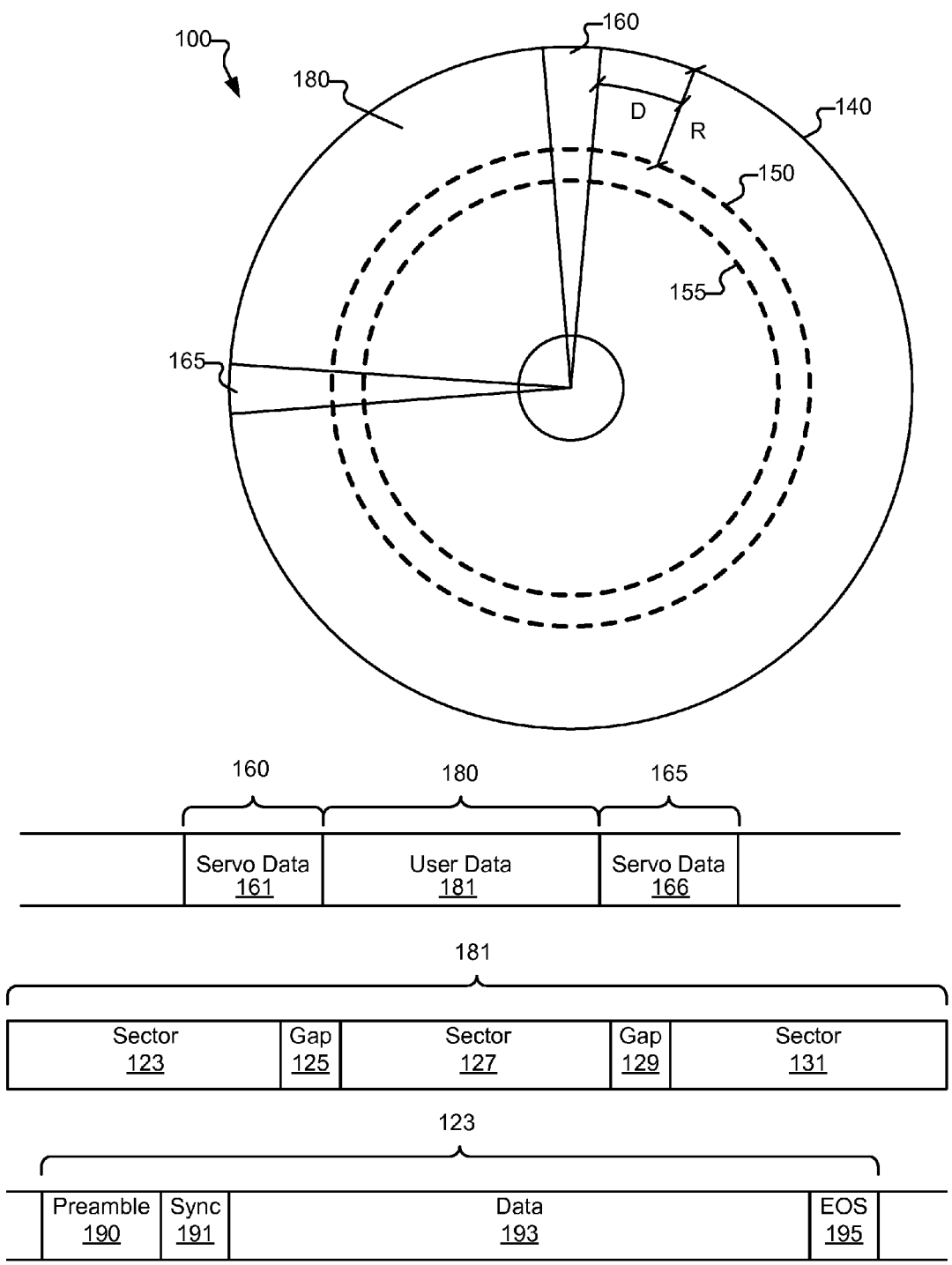
FIG. 1 depicts an existing storage medium including servo data.

Turning to FIG. 1, a storage medium 100 is shown with two exemplary tracks 150, 155 indicated as dashed lines. The tracks are segregated by servo data written within wedges 160, 165. These wedges include servo data 161, 166 that are used for control and synchronization of the read/write head assembly over a desired location on storage medium 100. In particular, this servo data generally includes a preamble pattern followed by a servo address mark (SAM). The servo address mark is followed by a Gray code, and the Gray code is followed by burst information. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after the burst information. A user data region 180 is disposed between wedges 160, 165. Each track 181 of user data region 180 includes one or more sectors 123, 127, 131 each separated by respective unused gap regions 125, 129. Each of the sectors of user data include a preamble 190, a sync 191, a user data area 193 and an end of sector pad 195.

Various embodiments of the present invention utilize periodic information within user data region 181 to perform fly height calculations. Using such data to perform fly height calculation provides a number of fly height useful data regions. As used herein, the phrase "fly height useful data regions" is used in its broadest sense to mean a region including data that may be used for calculating fly height. In some cases, the data that may be used for calculating fly height is periodic data. As just some examples, fly height useful data regions may include, but are not limited to, preamble 190, sync 191, end of sector pad 195, and random areas of data 193 that match defined criteria. In some cases, using the aforementioned data regions provides a relatively large volume of data compared with prior art approaches to fly height calculation that allows for increased noise reducing averaging over a given period yielding a corresponding increase in fly height accuracy calculation. Alternatively or in addition, the approaches may allow for using user data from a storage medium to perform on-line fly height calculation as data from the user data regions is read. Such on-line fly height calculations do not necessarily require interrupting regular read and write operations carried out in relation to a storage medium. Based upon the disclosure provided herein, one of ordinary skill in the art will recognize a variety of other advantages that may be achieved by implementation of circuits, systems and methods in accordance with the different embodiments of the present invention. In some embodiments of the present invention, the calculated fly height is used to update the location of the read/write head assembly during processing of intervening servo wedges. In various cases, a different weight is applied to fly height information calculated based upon the different fly height useful data regions depending upon a perceived or identified credibility difference between the particular regions.

Figure 2:
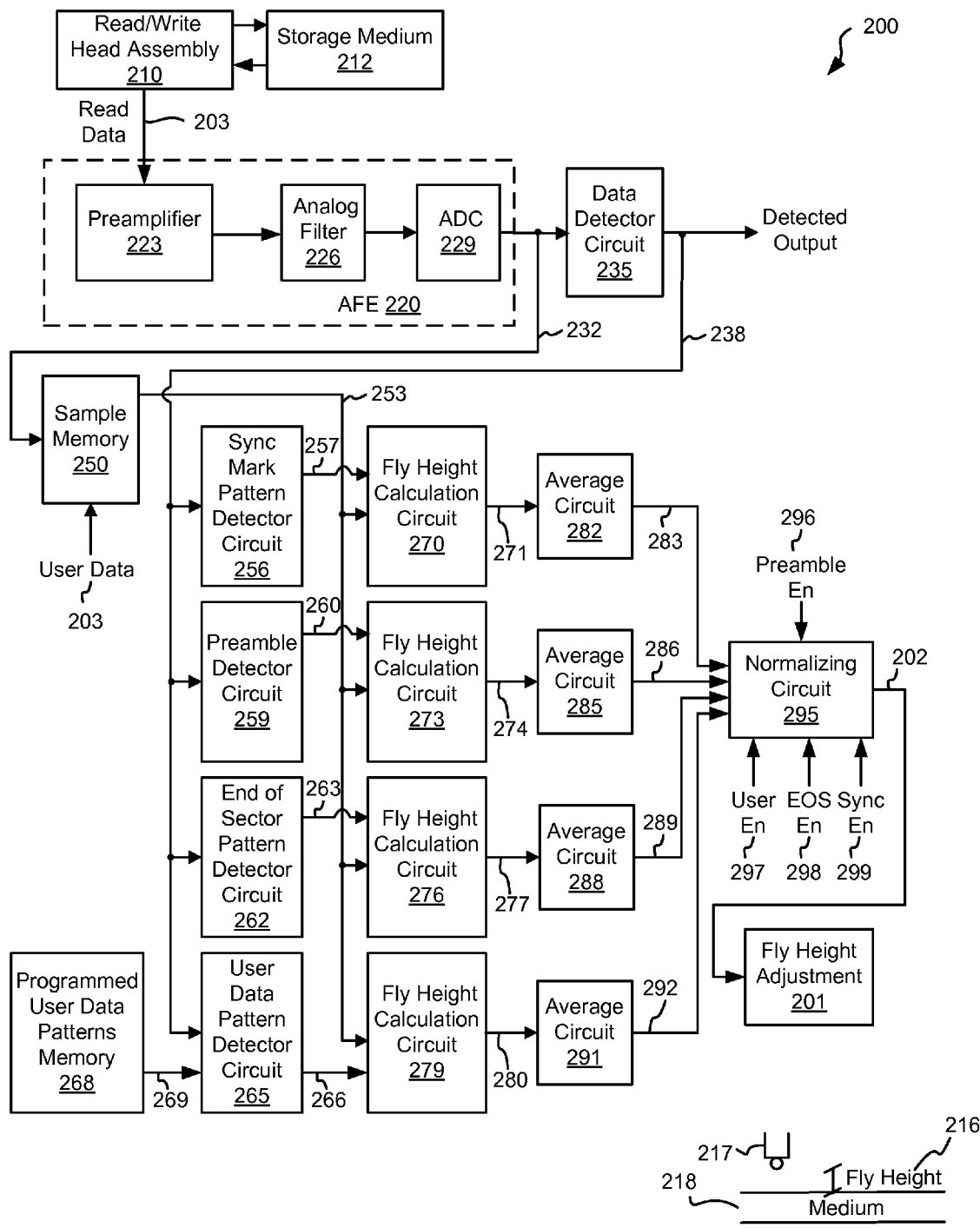
FIG. 2 depicts a user data based fly height calculation circuit in accordance with various embodiments of the present invention.

Turning to FIG. 2, a user data based fly height calculation circuit 200 is shown in accordance with various embodiments of the present invention. User data based fly height calculation circuit 200 includes a storage medium 212 that includes, inter alia, stored user data along tracks extending between servo wedges. A read/write head assembly 210 is disposed in relation to storage medium 212 and is operable to, inter alia, sense information stored on storage medium 212 and to provide a read data signal 203 corresponding to the sensed information. Storage medium 212 may be formatted in a number of ways. As one example, storage medium 212 may be formatted similar to that discussed above in relation to FIG. 1. Based upon the disclosure provided herein, one of ordinary skill in the art will recognize a variety of formats, storage media, and/or read/write head assemblies that may be used in relation to different embodiments of the present invention.

Read data signal 203 is provided to an analog front end circuit 220. Analog front end circuit 220 may be any analog front end circuit known in the art. As shown, analog front end circuit 220 includes a preamplifier circuit 223, an analog filter circuit 226, and analog to digital converter circuit 229. Read data signal 203 from read/write head assembly 210 is received by preamplifier circuit 223 that amplifies the signal and provides the amplified result to analog filter circuit 226. Analog filter circuit 226 filters the received signal and provides a corresponding filtered signal to analog to digital converter circuit 229. Analog to digital converter circuit 229 provides a series of digital samples 232 corresponding to the received data. Based upon the disclosure provided herein, one of ordinary skill in the art will recognize a variety of implementations of analog to digital converter circuit 229, analog filter circuit 226, and preamplifier circuit 223 that may be used in relation to different embodiments of the present invention.

Digital samples 232 are provided to a data detector circuit 235 that applies a data detection algorithm to a series of digital samples 223 to yield a detected output 238. In turn, detected output 238 may be provided to other downstream data processing circuits (not shown) for additional processing. Data detector circuit 235 may be any circuit capable of applying a data detection process known in the art. In one particular embodiments of the present invention, data detector circuit 235 is a Viterbi algorithm data detector circuit. In other embodiments of the present invention, data detector circuit 235 is a maximum a posteriori data detector circuit. Based upon the disclosure provided herein, one of ordinary skill in the art will recognize a variety of data detector circuits that may be used in relation to different embodiments of the present invention.

In addition, digital samples 232 are provided to a sample memory 250 where they are maintained for possible later use in relation to calculating fly height. Sample memory 250 is loaded with data from the user data region as indicated when a user data signal 204 is asserted. User data signal 204 may be asserted by a user/servo data region identification circuit (not shown). Detected output 238 is provided to a sync mark pattern detector circuit 256, a preamble detector circuit 259, an end of sector pattern detector circuit 262, and a user data pattern detector circuit 265. Sync mark pattern detector circuit 256 is operable to continuously query detected output 238 for a defined sync mark pattern. The defined sync mark pattern is selected such that it includes some level of periodicity rendering it "fly height useful". When the defined sync mark pattern is identified, sync mark pattern detector circuit 256 asserts a sync mark found output 257 that operates as an enable input to a fly height calculation circuit 270. Preamble detector circuit 259 is operable to continuously query detected output 238 for a defined preamble pattern. The defined preamble pattern is selected such that it includes some level of periodicity rendering it "fly height useful". When the defined preamble pattern is identified, preamble detector circuit 259 asserts a preamble found output 260 that operates as an enable input to a fly height calculation circuit 273. End of sector pattern detector circuit 262 is operable to continuously query detected output 238 for a defined end of sector pattern. The defined end of sector pattern is selected such that it includes some level of periodicity rendering it "fly height useful". When the end of sector pattern is identified, end of sector pattern detector circuit 262 asserts an end of sector found output 263 that operates as an enable input to a fly height calculation circuit 276. User data pattern detector circuit 265 is operable to continuously query detected output 238 for one or more defined periodic patterns that may randomly appear in the user data. The defined periodic patterns may be programmed into a programmed user data patterns memory 268, and are provided to user data pattern detector circuit 265 as a pattern input 269. The defined periodic patterns are selected such that each includes some level of periodicity rendering it "fly height useful". When one of the defined periodic patterns is identified, user data pattern detector circuit 265 asserts a period pattern found output 266 that operates as an enable input to a fly height calculation circuit 279.

Various different fly height calculations may be applied by fly height calculation circuit 270, fly height calculation circuit 273, fly height calculation circuit 276 and fly height calculation circuit 279 to calculate a respective fly height value based upon pattern input 253. In one particular embodiment of the present invention, each of fly height calculation circuit 270, fly height calculation circuit 273, fly height calculation circuit 276 and fly height calculation circuit 279 implement a fly height calculation algorithm relying on periodic data inputs and the Wallace spacing loss theory. The Wallace spacing loss theory states that the readback signal strength at any given frequency decays exponentially with increase in fly height, following $V(k,d) \propto \exp(-d \cdot k)$ where 'd' denotes fly-height and 'k' denotes frequency. Following this, the change in fly height from a reference fly height $d_1$ can be estimated using dual harmonics measurement in accordance with the following equation:

$$\Delta d = \frac{\Delta R}{k_2 - k_1} = \frac{\Delta R}{f_2 - f_1} \cdot \frac{v}{2\pi}$$

where
{$f_1, f_2$}=harmonic frequencies, $k=2\pi/\lambda$
v=linear velocity of the medium
$\Delta R = R_2 - R_1$=change in harmonic ratio
$\Delta d = d_2 - d_1$=change in fly height $$R_1(k_1, k_2) = \log\left(\left|\frac{V(k_1, d_1)}{V(k_2, d_1)}\right|\right), R_2(k_1, k_2) = \log\left(\left|\frac{V(k_1, d_2)}{V(k_2, d_2)}\right|\right).$$

Readback signal strength at selected frequencies $f_1$ & $f_2$ are measured from a periodic pattern recorded on the medium. The pattern is selected such that it contains both of these frequencies as harmonics. Examples of fly height friendly patterns are patterns with period 8T, 10T & 12T where 'T' denotes the duration of one bit. The sync-mark and EOS pad can be configured to correspond any of these (or, similar) pattern. Examples of 8T pattern are [+1, +1, +1, +1, −1, −1, −1, −1] and [+1, +1, −1, +1, +1, −1, +1, −1]. It is also possible to exploit the last part of preamble to enhance the data length available for fly height computation.

Harmonic calculations required for fly height are performed using standard DFT (discrete Fourier transform) computations. These are given by:

$$V(k, d) = \sum_{n=0}^{N-1} x[n] \cdot c_k[n] + j \sum_{n=0}^{N-1} x[n] \cdot s_k[n]$$

where x[n] denotes the averaged readback of length one period at ADC output, N denotes the length of the period (in bits) of the pattern, and ck[n]& sk[n] denote the cos and sin kernals required for DFT computation. For 8T pattern (i.e. N=8), we have the kernals for $1^{st}$ and $3^{rd}$ harmonics as follows:
$c_1[n]$={1.00, 0.7071, 0.00, −0.7071, −1.00, −0.7071, 0.00, 0.7071}
$s_1[n]$={0.00, 0.7071, 1.00, 0.071, 0.00, −0.7071, −1.00, 0.7071}
$c_3[n]$={1.00, −0.7071, 0.00, 0.7071, −1.00, 0.7071, 0.00, −0.7071}
$s_3[n]$={0.00, −1.00, 0.7071, 0.00, −0.7071, 1.00, −0.7 071}.
For 10T pattern (i.e. N=10), we have the kernals for $1^{st}$ and $3^{rd}$ harmonics as follows:
$c_1[n]$={1.00, 0.8090, 0.3090, −0.3090, −0.8090, −1.00, −0.8090, −0.3090, 0.3090, 0.8090}
$s_1[n]$={0.00, 0.5878, 0.9511, 0.9511, 0.5878 0.00, −0.5878, −0.9511, −0.9511, −0.5878}
$c_3[n]$={1.00, −0.3090, −0.8090, 0.8090, 0.3090, −1.00, 0.3090, 0.8090, −0.8090, −0.3090}
$s_3[t]$={0.00, 0.9511, −0.5878, −0.5878, 0.9511, 0.00, −0.9511, 0.5878, 0.5878, −0.9511}.
For 12T pattern (i.e. N=12), we have the kernals for $1^{st}$ and $3^{rd}$ harmonics as follows:
$c_1[n]$={1.00, 0.866, 0.50, 0.00, −0.500, −0.866, −1.00, −0.866, −0.50, −0.00, 0.50, 0.866}
$s_1[n]$={0.00, 0.50, 0.866, 1.00, 0.866, 0.50, 0.00, −0.50, −0.866, −1.00, −0.866, −0.50}
$c_3[n]$={1.00, 0.00, −1.00, −0.00, 1.00, 0.00, −1.00, −0.00, 1.00, 0.00, −1.00, 0.00}
$s_3[n]$={0.00, 1.00, 0.00, −1.00, −0.00, 1.00, 0.00, −1.00, −0.00, 1.00, 0.00, −1.00}.

It should be noted that in some embodiments of the present invention each of fly height calculation circuit 270, fly height calculation circuit 273, fly height calculation circuit 276, and fly height calculation circuit 279 may each be implemented differently. Further, it should be noted that each of the aforementioned fly height calculation circuits may operate on a different length input pattern (i.e., a respective portion of pattern input 253).

Fly height calculation circuit 271 provides a fly height value 271 to an average circuit 282 where a running average of received fly height values based on sync mark patterns is calculated and provided as a sync mark fly height average 283. Similarly, fly height calculation circuit 273 provides a fly height value 274 to an average circuit 285 where a running average of received fly height values based on preamble patterns is calculated and provided as a preamble fly height average 286; fly height calculation circuit 276 provides a fly height value 277 to an average circuit 288 where a running average of received fly height values based on end of sector patterns is calculated and provided as an end of sector fly height average 289; and fly height calculation circuit 279 provides a fly height value 279 to an average circuit 291 where a running average of received fly height values based on user data patterns is calculated and provided as a user data fly height average 292.

Sync mark fly height average 283, preamble fly height average 286, end of sector fly height average 289, and user data fly height average 292 are provided to a normalizing circuit 295 where they are combined into a single composite fly height value 202. For example, where all four fly height values are to be combined, a preamble enable signal 296 (corresponding to preamble fly height average 286), a user enable signal 297 (corresponding to user data fly height value 292), an end of sector enable 298 (corresponding to end of sector fly height average 289), and a sync enable 299 (corresponding to sync mark fly height average 283) are asserted. Where all of the preamble signals are asserted, normalizing circuit 295 equally weights each input to yield composite fly height output 202 in accordance with the following equation:

Composite fly height output 202=(0.25)(sync mark fly height average 283)+(0.25)(preamble fly height average 286)+(0.25)(end of sector fly height average 289)+(0.25)(user data fly height average 292).

Alternatively, where only three of the four enables are asserted, normalizing circuit 295 combines the corresponding three average outputs into composite fly height output 202, and excludes the average corresponding to the enable that is not asserted. For example, where user enable signal 297 is not asserted, and the other three enables are asserted, normalizing circuit 295 provides a composite fly height output 202 in accordance with the following equation:

Composite fly height output 202=(0.33)(sync mark fly height average 283)+(0.33)(preamble fly height average 286)+(0.33)(end of sector fly height average 289).

Alternatively, where only two of the four enables are asserted, normalizing circuit 295 combines the two average outputs that are enabled into composite fly height output 202, and excludes the averages corresponding to the enables that are not asserted. For example, where user enable signal 297 and preamble enable signal 296 are not asserted, and the other two enables are asserted, normalizing circuit 295 provides a composite fly height output 202 in accordance with the following equation:

Composite fly height output 202=(0.50)(sync mark fly height average 283)+(0.50)(end of sector fly height average 289).

Alternatively, where only one of the four enables are asserted, normalizing circuit 295 provides the average output corresponding to the asserted enable as composite fly height output 202, and excludes the averages corresponding to the three enables that are not asserted.

The resulting composite fly height output 202 is provided to a fly height adjustment circuit 201 that is operable to adjust a distance 216 (fly height) between a read/write head assembly 217 and a corresponding storage medium 218 in accordance with the magnitude and sign of composite fly height output 202. Fly height adjustment circuit 201 may be any circuit known in the art that is capable of adjusting fly height.

Figure 3:
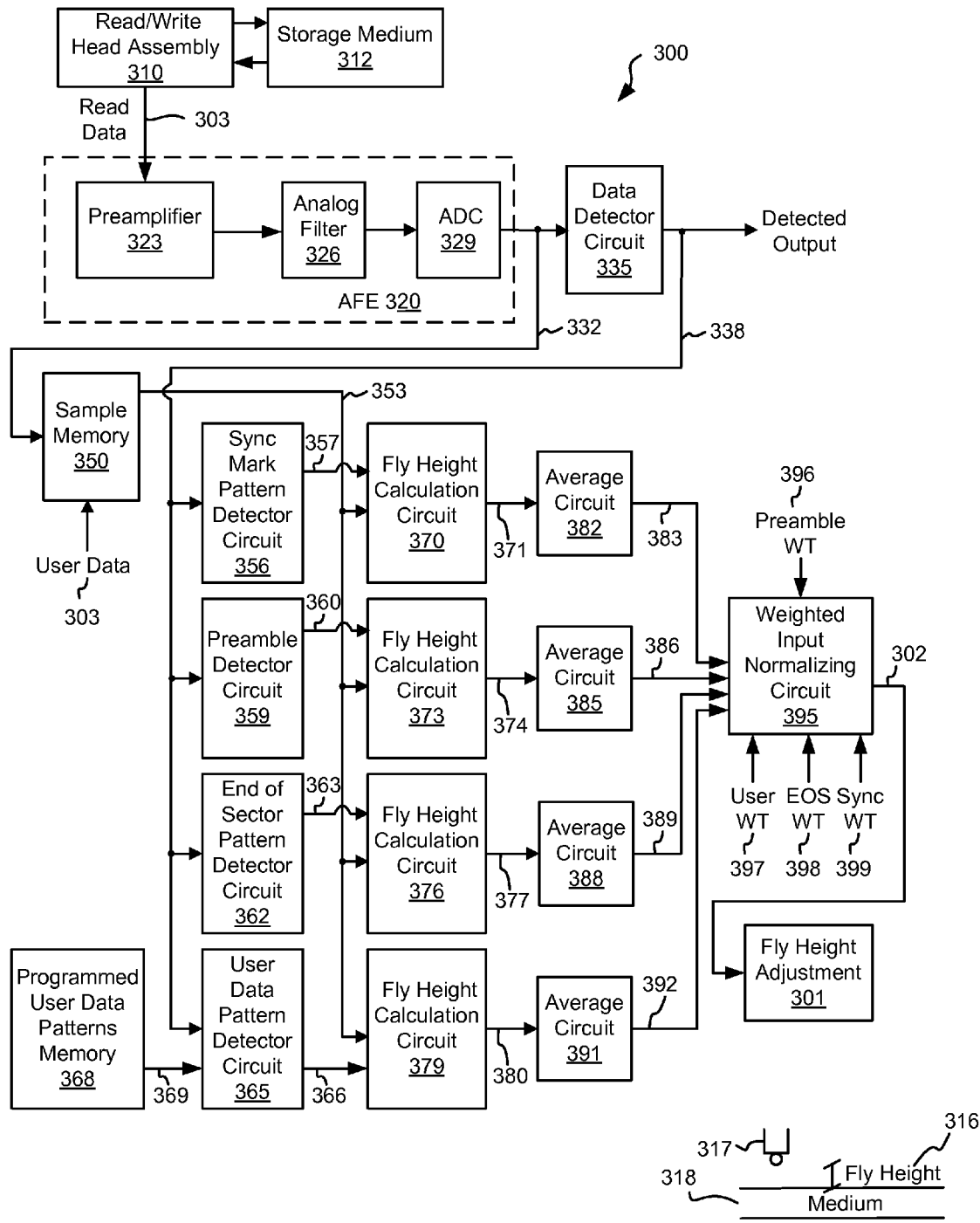
FIG. 3 shows another user data based fly height calculation circuit in accordance with other embodiments of the present invention.

Turning to FIG. 3, another user data based fly height calculation circuit 300 is shown in accordance with other embodiments of the present invention. User data based fly height calculation circuit 300 includes a storage medium 312 that includes, inter alia, stored user data along tracks extending between servo wedges. A read/write head assembly 310 is disposed in relation to storage medium 312 and is operable to, inter alia, sense information stored on storage medium 312 and to provide a read data signal 303 corresponding to the sensed information. Storage medium 312 may be formatted in a number of ways. As one example, storage medium 312 may be formatted similar to that discussed above in relation to FIG. 1. Based upon the disclosure provided herein, one of ordinary skill in the art will recognize a variety of formats, storage media, and/or read/write head assemblies that may be used in relation to different embodiments of the present invention.

Read data signal 303 is provided to an analog front end circuit 320. Analog front end circuit 320 may be any analog front end circuit known in the art. As shown, analog front end circuit 320 includes a preamplifier circuit 323, an analog filter circuit 326, and analog to digital converter circuit 329. Read data signal 303 from read/write head assembly 310 is received by preamplifier circuit 323 that amplifies the signal and provides the amplified result to analog filter circuit 326. Analog filter circuit 326 filters the received signal and provides a corresponding filtered signal to analog to digital converter circuit 329. Analog to digital converter circuit 329 provides a series of digital samples 332 corresponding to the received data. Based upon the disclosure provided herein, one of ordinary skill in the art will recognize a variety of implementations of analog to digital converter circuit 329, analog filter circuit 326, and preamplifier circuit 323 that may be used in relation to different embodiments of the present invention.

Digital samples 332 are provided to a data detector circuit 335 that applies a data detection algorithm to a series of digital samples 323 to yield a detected output 338. In turn, detected output 338 may be provided to other downstream data processing circuits (not shown) for additional processing. Data detector circuit 335 may be any circuit capable of applying a data detection process known in the art. In one particular embodiments of the present invention, data detector circuit 335 is a Viterbi algorithm data detector circuit. In other embodiments of the present invention, data detector circuit 335 is a maximum a posteriori data detector circuit. Based upon the disclosure provided herein, one of ordinary skill in the art will recognize a variety of data detector circuits that may be used in relation to different embodiments of the present invention.

In addition, digital samples 332 are provided to a sample memory 350 where they are maintained for possible later use in relation to calculating fly height. Sample memory 350 is loaded with data from the user data region as indicated when a user data signal 304 is asserted. User data signal 304 may be asserted by a user/servo data region identification circuit (not shown). Detected output 338 is provided to a sync mark pattern detector circuit 356, a preamble detector circuit 359, an end of sector pattern detector circuit 362, and a user data pattern detector circuit 365. Sync mark pattern detector circuit 356 is operable to continuously query detected output 338 for a defined sync mark pattern. The defined sync mark pattern is selected such that it includes some level of periodicity rendering it "fly height useful". When the defined sync mark pattern is identified, sync mark pattern detector circuit 356 asserts a sync mark found output 357 that operates as an enable input to a fly height calculation circuit 370. Preamble detector circuit 359 is operable to continuously query detected output 338 for a defined preamble pattern. The defined preamble pattern is selected such that it includes some level of periodicity rendering it "fly height useful". When the defined preamble pattern is identified, preamble detector circuit 359 asserts a preamble found output 360 that operates as an enable input to a fly height calculation circuit 373. End of sector pattern detector circuit 362 is operable to continuously query detected output 338 for a defined end of sector pattern. The defined end of sector pattern is selected such that it includes some level of periodicity rendering it "fly height useful". When the end of sector pattern is identified, end of sector pattern detector circuit 362 asserts an end of sector found output 363 that operates as an enable input to a fly height calculation circuit 376. User data pattern detector circuit 365 is operable to continuously query detected output 338 for one or more defined periodic patterns that may randomly appear in the user data. The defined periodic patterns may be programmed into a programmed user data patterns memory 368, and are provided to user data pattern detector circuit 365 as a pattern input 369. The defined periodic patterns are selected such that each includes some level of periodicity rendering it "fly height useful". When one of the defined periodic patterns is identified, user data pattern detector circuit 365 asserts a period pattern found output 366 that operates as an enable input to a fly height calculation circuit 379.

Various different fly height calculations may be applied by fly height calculation circuit 370, fly height calculation circuit 373, fly height calculation circuit 376 and fly height calculation circuit 379 to calculate a respective fly height value based upon pattern input 353. In one particular embodiment of the present invention, each of fly height calculation circuit 370, fly height calculation circuit 373, fly height calculation circuit 376 and fly height calculation circuit 379 implement a fly height calculation algorithm relying on periodic data inputs and the Wallace spacing loss theory. The Wallace spacing loss theory states that the readback signal strength at any given frequency decays exponentially with increase in fly height, following $V(k,d) \propto \exp(-d \cdot k)$ where 'd' denotes fly-height and 'k' denotes frequency. Following this, the change in fly height from a reference fly height $d_1$ can be estimated using dual harmonics measurement in accordance with the following equation:

$$\Delta d = \frac{\Delta R}{k_2 - k_1} = \frac{\Delta R}{f_2 - f_1} \cdot \frac{v}{2\pi}$$

where
$\{f_1, f_2\}$=harmonic frequencies, $k=2\pi/\lambda$
v=linear velocity of the medium
$\Delta R = R_2 - R_1$=change in harmonic ratio
$\Delta d = d_2 - d_1$=change in fly height $$R_1(k_1, k_2) = \log\left(\left|\frac{V(k_1, d_1)}{V(k_2, d_1)}\right|\right), R_2(k_1, k_2) = \log\left(\left|\frac{V(k_1, d_2)}{V(k_2, d_2)}\right|\right).$$

Readback signal strength at selected frequencies $f_1$ & $f_2$ are measured from a periodic pattern recorded on the medium. The pattern is selected such that it contains both of these frequencies as harmonics. Examples of fly height friendly patterns are patterns with period 8T, 10T & 12T where 'T' denotes the duration of one bit. The sync-mark and EOS pad can be configured to correspond any of these (or, similar) pattern. Examples of 8T pattern are [+1, +1, +1, +1, −1, −1, −1, −1] and [+1, +1, −1, +1, +1, −1, +1, −1]. It is also possible to exploit the last part of preamble to enhance the data length available for fly height computation.

Harmonic calculations required for fly height are performed using standard DFT (discrete Fourier transform) computations. These are given by:

$$V(k, d) = \sum_{n=0}^{N-1} x[n] \cdot c_k[n] + j \sum_{n=0}^{N-1} x[n] \cdot s_k[n]$$

where x[n] denotes the averaged readback of length one period at ADC output, N denotes the length of the period (in bits) of the pattern, and ck[n] & sk[n] denote the cos and sin kernals required for DFT computation. For 8T pattern (i.e. N=8), we have the kernals for $1^{st}$ and $3^{rd}$ harmonics as follows:
$c_1[n]$={1.00, 0.7071, 0.00, −0.7071, −1.00, −07071, 0.00, 0.7071}
$s_1[n]$={0.00, 0.7071, 1.00, 0.7071, 0.00, −0.7071, −1.00, 0.7071}
$c_3[n]$={1.00, −07071, 0.00, 0.7071, −1.00, 0.7071, 0.00, −0.7071}
$s_3[n]$={0.00, 0.7071, −1.00, 0.071, 0.00, −0.7071, 1.00, −0.7071}.
For 10T pattern (i.e. N=10), we have the kernals for $1^{st}$ and $3^{rd}$ harmonics as follows:
$c_1[n]$={1.00, 0.8090, 0.3090, −0.3090, −0.8090, −1.00, −0.8090, −0.3090, 0.3090, 0.8090}
$s_1[n]$={0.00, 0.5878, 0.9511, 0.9511, 0.5878 0.00, −0.5878, −0.9511, −0.9511, −0.5878}
$c_3[n]$={1.00, −0.3090, −0.8090, 0.8090, 0.3090, −1.00, 0.3090, 0.8090, −0.8090, −0.3090}
$s_3[n]$={0.00, 0.9511, −0.5878, −0.5878, 0.9511, 0.00, −0.9511, 0.5878, 0.5878, −0.9511}.
For 12T pattern (i.e. N=12), we have the kernals for $1^{st}$ and $3^{rd}$ harmonics as follows:
$c_1[n]$={1.00, 0.866, 0.50, 0.00, −0.500, −0.866, −1.00, −0.866, −0.50, −0.00, 0.50, 0.866}
$s_1[n]$={0.00, 0.50, 0.866, 1.00, 0.866, 0.50, 0.00, −0.50, −0.866, −1.00, −0.866, −0.50}
$c_3[n]$={1.00, 0.00, −1.00, −0.00, 1.00, 0.00, −1.00, −0.00, 1.00, 0.00, −1.00, 0.00}
$s_3[n]$={0.00, 1.00, 0.00, −1.00, −0.00, 1.00, 0.0, −100, −0.00, 1.00, 0.00, −1.00}.

It should be noted that in some embodiments of the present invention each of fly height calculation circuit 370, fly height calculation circuit 373, fly height calculation circuit 376, and fly height calculation circuit 379 may each be implemented differently. Further, it should be noted that each of the aforementioned fly height calculation circuits may operate on a different length input pattern (i.e., a respective portion of pattern input 353).

Fly height calculation circuit 371 provides a fly height value 371 to an average circuit 382 where a running average of received fly height values based on sync mark patterns is calculated and provided as a sync mark fly height average 383. Similarly, fly height calculation circuit 373 provides a fly height value 374 to an average circuit 385 where a running average of received fly height values based on preamble patterns is calculated and provided as a preamble fly height average 386; fly height calculation circuit 376 provides a fly height value 377 to an average circuit 388 where a running average of received fly height values based on end of sector patterns is calculated and provided as an end of sector fly height average 389; and fly height calculation circuit 379 provides a fly height value 379 to an average circuit 391 where a running average of received fly height values based on user data patterns is calculated and provided as a user data fly height average 392.

Sync mark fly height average 383, preamble fly height average 386, end of sector fly height average 389, and user data fly height average 392 are provided to a normalizing circuit 395 where they are combined into a single composite fly height value 302 using input weights (Preamble WT 396 corresponding to preamble fly height average 386, user WT 397 corresponding to user data fly height average 392, end of sector WT 398 corresponding to end of sector fly height average 389, and sync WT 399 corresponding to sync mark fly height average 383) in accordance with the following equation:

Composite fly height output 302=(sync WT 399)(sync mark fly height average 383)+(Preamble WT 396)(preamble fly height average 386)+(end of sector WT 398)(end of sector fly height average 389)+(user WT 397)(user data fly height average 392).

In some embodiments, the sum of preamble WT 396, user WT 397, end of sector WT 398, and sync WT 399 is one.

The resulting composite fly height output 302 is provided to a fly height adjustment circuit 301 that is operable to adjust a distance 316 (fly height) between a read/write head assembly 317 and a corresponding storage medium 318 in accordance with the magnitude and sign of composite fly height output 302. Fly height adjustment circuit 301 may be any circuit known in the art that is capable of adjusting fly height.

Figure 4:
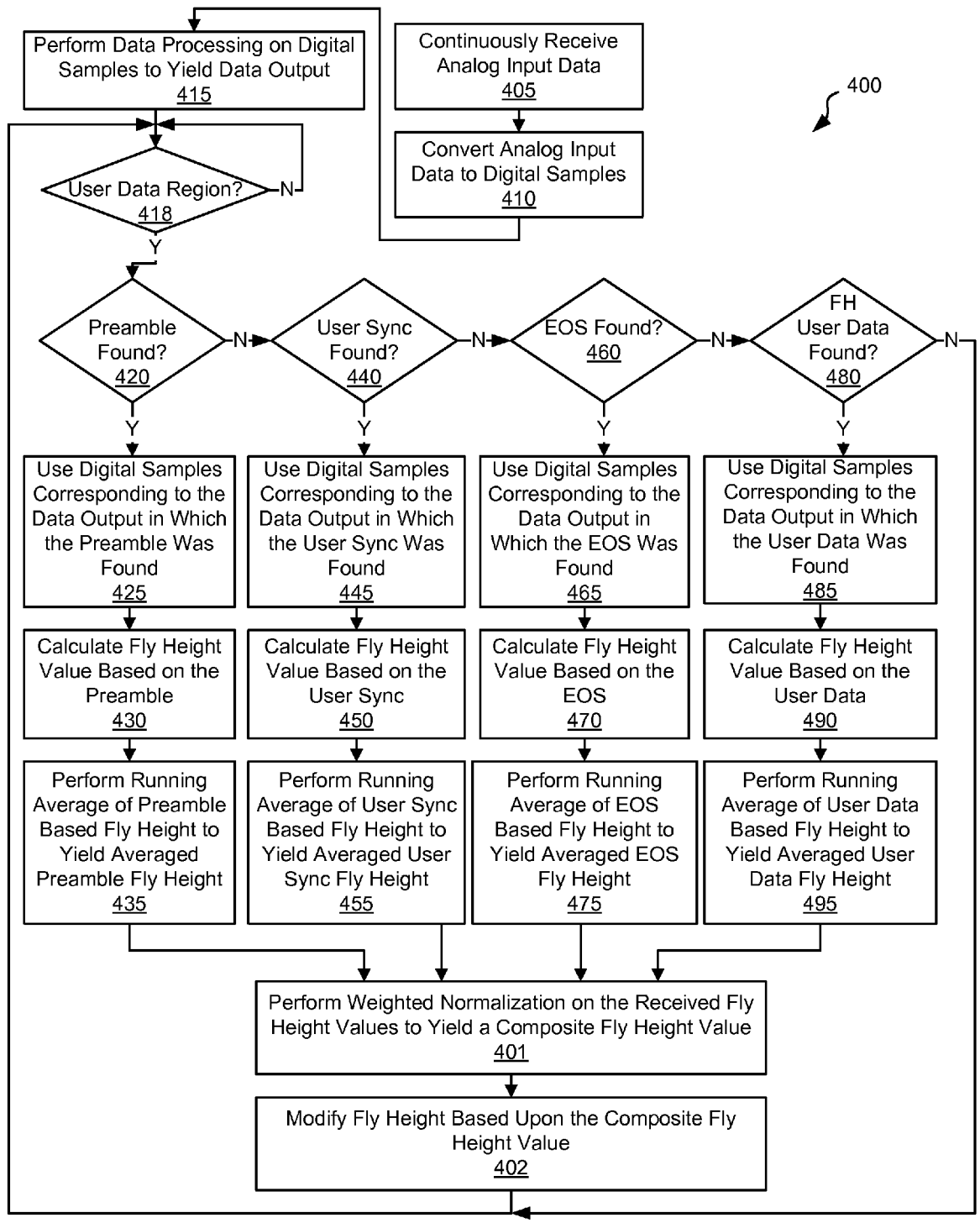
FIG. 4 is a flow diagram showing a method in accordance with one or more embodiments of the present invention for calculating fly height based upon user data.

Turning now to FIG. 4, a flow diagram 400 shows a method in accordance with one or more embodiments of the present invention for calculating fly height based upon user data. Following flow diagram 400, an analog input is continuously received (block 405). In some cases, this analog signal is received from an analog front end circuit processing information received from a storage medium. The analog input is converted to a series of digital samples by an analog to digital converter circuit (block 410). The conversion to the series of digital samples may be done using any analog to digital conversion methodology known in the art. Data processing is applied to the series of digital samples to yield a data output (block 415). In some cases, this data processing may be a data detection process known in the art such as, for example, a maximum a posteriori data detection process or a Viterbi algorithm data detection process. Based upon the disclosure provided herein, one of ordinary skill in the art will recognize a variety of data detection processes that may be used in relation to different embodiments of the present invention.

It is determined whether a user data region is being processes (i.e., a region between two servo data wedges) (block 418). Where a user data region is being processed (block 418), it is determined whether a preamble associated with one or more sectors of user data is found (block 420). Where a preamble is found (block 420), the received digital samples that correspond to the identified preamble are identified (block 425). These identified digital samples are used to calculate a fly height value based upon the preamble (block 430). The fly height may be calculated using any fly height calculation algorithm known in the art. The calculated fly height based upon the preamble is incorporated into a running average of other similar fly height values to yield an averaged preamble fly height (block 435).

Alternatively, where a preamble is not found (block 420), it is determined whether a user sync mark associated with one or more sectors of user data is found (block 440). Where a user sync mark is found (block 440), the received digital samples that correspond to the identified user sync mark are identified (block 445). These identified digital samples are used to calculate a fly height value based upon the user sync mark (block 450). The fly height may be calculated using any fly height calculation algorithm known in the art. The calculated fly height based upon the user sync mark is incorporated into a running average of other similar fly height values to yield an averaged sync mark fly height (block 455).

Alternatively, where a preamble is not found (block 460), it is determined whether an end of sector mark associated with one or more sectors of user data is found (block 460). Where an end of sector mark is found (block 460), the received digital samples that correspond to the identified end of sector mark are identified (block 465). These identified digital samples are used to calculate a fly height value based upon the end of sector mark (block 470). The fly height may be calculated using any fly height calculation algorithm known in the art. The calculated fly height based upon the end of sector mark is incorporated into a running average of other similar fly height values to yield an averaged end of sector fly height (block 475).

Alternatively, where an end of sector mark is not found (block 460), it is determined whether a predetermined pattern within the user data is found (block 480). Where such a predetermined pattern is found (block 480), the received digital samples that correspond to the identified predetermined pattern are identified (block 485). These identified digital samples are used to calculate a fly height value based upon the predetermined pattern (block 490). The fly height may be calculated using any fly height calculation algorithm known in the art. The calculated fly height based upon the user sync mark is incorporated into a running average of other similar fly height values to yield an averaged user data pattern fly height (block 495).

The averaged preamble fly height, the averaged user sync fly height, the averaged end of sector fly height, and the averaged user data fly height are used to perform a weighted normalization to yield a composite fly height value (block 401). In some cases, the composite value is calculated in accordance with the following equation:

Composite fly height output=(sync mark weight)(averaged sync mark)+(preamble weight)(averaged preamble fly height)+(end of sector weight)(averaged end of sector fly height)+(user data weight) (averaged user data fly height).

In some embodiments, sync mark weight, preamble weight, user data weight, end of sector weight, and user data weight are programmable weighting factors, and in some cases the sum of the four weighting factors is one. The composite fly height value is then used to modify a fly height (block 402).

Figure 5A:
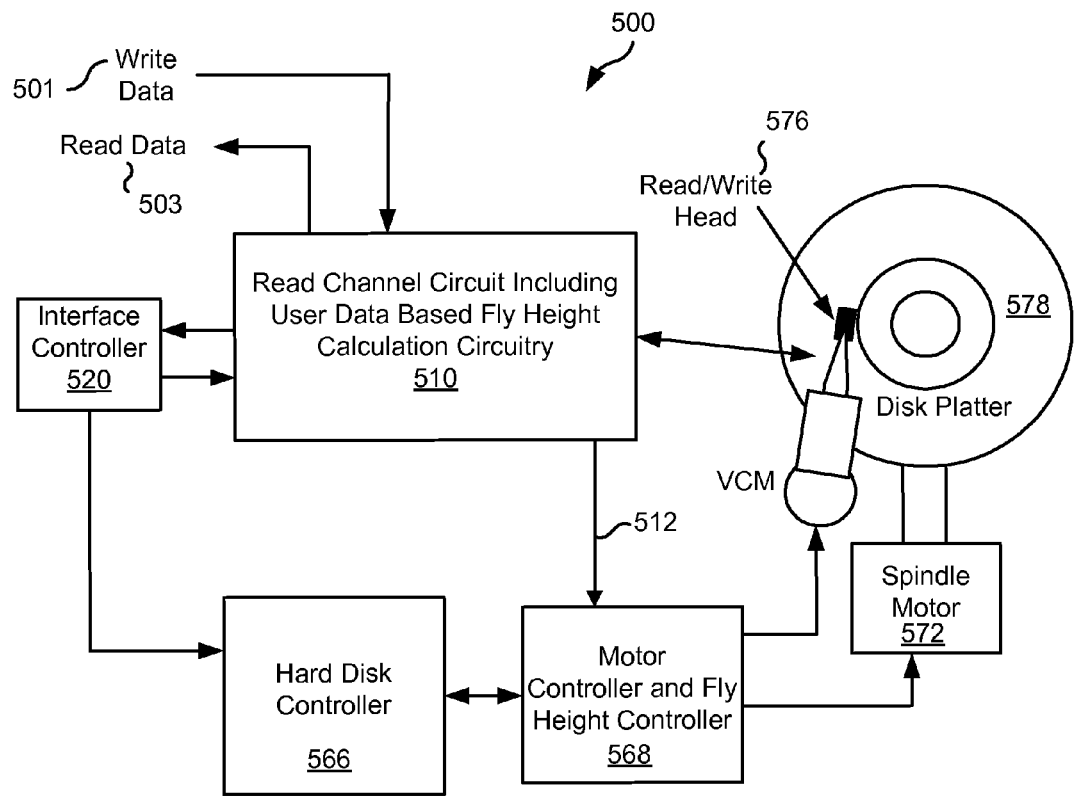
FIG. 5a depicts a storage device including a read channel having user data based fly height calculation circuitry in accordance with one or more embodiments of the present invention.

Turning to FIG. 5*a*, a storage device 500 including a read channel circuit 510 having user data based fly height calculation circuitry is shown in accordance with one or more embodiments of the present invention. Storage device 500 may be, for example, a hard disk drive. Further, read channel circuit 510 may include a data detector, such as, for example, a Viterbi algorithm data detector, and/or a data decoder circuit, such as, for example, a low density parity check decoder circuit. In addition to read channel circuit 510, storage device 500 includes a read/write head assembly 576 disposed in relation to a disk platter 578. Read/write head assembly 576 is operable to sense information stored on disk platter 578 and to provide a corresponding electrical signal to read channel circuit 510.

Storage device 500 also includes an interface controller 520, a hard disk controller 566, a motor controller and fly height controller 568, and a spindle motor 572. Interface controller 520 controls addressing and timing of data to/from disk platter 578. The data on disk platter 578 consists of groups of magnetic signals that may be detected by read/write head assembly 576 when the assembly is properly positioned over disk platter 578. In one embodiment, disk platter 578 includes magnetic signals recorded in accordance with a perpendicular recording scheme. In other embodiments of the present invention, disk platter 578 includes magnetic signals recorded in accordance with a longitudinal recording scheme. Motor controller and fly height controller 568 controls the spin rate of disk platter 578 and the location of read/write head assembly 576 in relation to disk platter 578.

Figure 5B:
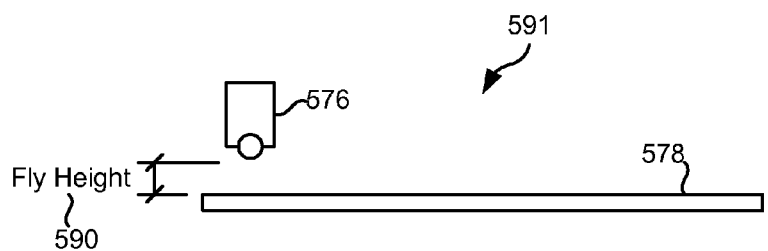

As shown in a cross sectional diagram 491 of FIG. 5*b*, the distance between read/write head assembly 576 and disk platter 578 is a fly height 590. Fly height 590 is controlled by motor controller and fly height controller 568 based upon a harmonics value 512 provided by read channel circuit 510.

In a typical read operation, read/write head assembly 576 is accurately positioned by motor controller and fly height controller 568 over a desired data track on disk platter 578. Motor controller and fly height controller 568 both positions read/write head assembly 576 in relation to disk platter 578 (laterally and vertically) and drives spindle motor 572 by moving read/write head assembly 576 to the proper data track on disk platter 578 under the direction of hard disk controller 566. Spindle motor 572 spins disk platter 578 at a determined spin rate (RPMs). Once read/write head assembly 578 is positioned adjacent the proper data track, magnetic signals representing data on disk platter 578 are sensed by read/write head assembly 576 as disk platter 578 is rotated by spindle motor 572. The sensed magnetic signals are provided as a continuous, minute analog signal representative of the magnetic data on disk platter 578. This minute analog signal is provided by read/write head assembly 576 to read channel circuit 510. In turn, read channel circuit 510 decodes and digitizes the received analog signal to recreate the information originally written to disk platter 578. This data is provided as read data 503 to a receiving circuit. A write operation is substantially the opposite of the preceding read operation with write data 501 being provided to read channel circuit 510. This data is then encoded and written to disk platter 578.

At times, a signal derived from disk platter 578 may be processed to determine fly height. In some embodiments of the present invention, determining the fly height may be done consistent with the methods discussed above in relation to FIG. 4. In various cases, a circuit consistent with that discussed in relation to FIG. 2 or FIG. 3 above may be used to perform user data based fly height calculation. In various cases, fly height is re-evaluated when a change in operational status of storage device 500 is detected. Such an operational change may include, but is not limited to, a change in an operational voltage level, a change in an operational temperature, a change in altitude, or a change in bit error rate. Based upon the disclosure provided herein, one of ordinary skill in the art will recognize a variety of operational status that may be monitored in storage device 500, and how changes in such status may be utilized to trigger a re-evaluation of fly height.

It should be noted that storage system 500 may be integrated into a larger storage system such as, for example, a RAID (redundant array of inexpensive disks or redundant array of independent disks) based storage system. It should also be noted that various functions or blocks of storage system 500 may be implemented in either software or firmware, while other functions or blocks are implemented in hardware.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for measuring harmonics. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A circuit for calculating a fly height value, the circuit comprising:
    a first pattern detector circuit operable to identify a first pattern in a received data set, wherein the received data set corresponds to user data disposed between a first servo data region and a second servo data region;
    a first pattern fly height calculation circuit operable to calculate a first fly height using data values corresponding to the first pattern to yield a first pattern fly height output;
    a first averaging circuit operable to average the first pattern fly height output with other instances of the first fly height output to yield a first averaged output;
    a second pattern detector circuit operable to identify a second pattern in the received data set;
    a second pattern fly height calculation circuit operable to calculate a second fly height using data values corresponding to the second pattern to yield a second pattern fly height output;
    a second averaging circuit operable to average the second pattern fly height output with other instances of the second pattern fly height output to yield a second averaged output; and
    a combining circuit operable to combine at least the first averaged output and the second averaged output to yield a composite fly height value.

2. The circuit of claim 1, wherein the first pattern is a first periodic pattern, and wherein the second pattern is a second periodic pattern.

3. The circuit of claim 1, wherein the first pattern is selected from a group consisting of: a sync mark pattern, a preamble pattern, an end of sector pattern, and a predetermined pattern within a user data region.

4. The circuit of claim 1, wherein the second pattern is selected from a group consisting of: a sync mark pattern, a preamble pattern, an end of sector pattern, and a predetermined pattern within a user data region.

5. The circuit of claim 1, wherein the combining circuit is operable to normalize the at least the first averaged output and the second averaged output to one.

6. The circuit of claim 1, wherein the combining circuit is operable to:
    multiply the first averaged output by a first weighting factor to yield a first weighted value;
    multiply the second averaged output by a second weighting factor to yield a second weighted value; and
    sum at least the first weighted value and the second weighted value to yield the composite fly height value.

7. The circuit of claim 1, wherein the circuit is implemented as part of an integrated circuit.

8. The circuit of claim 1, wherein the circuit is implemented as part of a storage device.

9. The circuit of claim 1, wherein the first pattern is a sync pattern, and wherein the second pattern is an end of sector pattern.

10. The circuit of claim 9, wherein the circuit further comprises:
    a preamble pattern detector circuit operable to identify a preamble pattern in the received data set;
    a third pattern fly height calculation circuit operable to calculate a third fly height using data values corresponding to the preamble pattern to yield a third pattern fly height output;
    a third averaging circuit operable to average the third pattern fly height output with other instances of the third fly height output to yield a third averaged output; and
    wherein the combining circuit is further operable to combine at least the first averaged output, the second averaged output, and the third averaged output to yield the composite fly height value.

11. The circuit of claim 9, wherein the circuit further comprises:

a predetermined pattern within a user data region detector circuit operable to identify a predetermined pattern in the received data set;

a third pattern fly height calculation circuit operable to calculate a third fly height using data values corresponding to the predetermined pattern to yield a third pattern fly height output;

a third averaging circuit operable to average the third pattern fly height output with other instances of the third fly height output to yield a third averaged output; and wherein the combining circuit is further operable to combine at least the first averaged output, the second averaged output, and the third averaged output to yield the composite fly height value.

12. The circuit of claim 11, wherein the circuit further comprises:

a programmed user data memory operable to receive and store the predetermined pattern.

13. A method for fly height modification, the method comprising:

receiving a data set, wherein the data set is derived from a storage medium via a head assembly, and wherein the data set corresponds to user data disposed between a first servo data region and a second servo data region;

identifying a first pattern in the received data set;

calculating a first fly height using data values corresponding to the first pattern to yield a first pattern fly height output;

averaging the first pattern fly height output with other instances of the first fly height output to yield a first averaged output;

identifying a second pattern in the received data set;

calculating a second fly height using data values corresponding to the second pattern to yield a second pattern fly height output;

averaging the second pattern fly height output with other instances of the second fly height output to yield a second averaged output;

combining at least the first averaged output and the second averaged output to yield a composite fly height value; and modifying a distance between the head assembly and the storage medium based at least in part on the composite fly height value.

14. The method of claim 13, wherein the first pattern is selected from a group consisting of: a sync mark pattern, a preamble pattern, an end of sector pattern, and a predetermined pattern within a user data region.

15. The method of claim 13, wherein the second pattern is selected from a group consisting of: a sync mark pattern, a preamble pattern, an end of sector pattern, and a predetermined pattern within a user data region.

16. The method of claim 13, wherein combining the at least the first averaged output and the second averaged output to yield the composite fly height value includes normalizing the at least the first averaged output and the second averaged output to one.

17. The method of claim 13, wherein combining the at least the first averaged output and the second averaged output to yield the composite fly height value includes:

multiplying the first averaged output by a first weighting factor to yield a first weighted value;

multiplying the second averaged output by a second weighting factor to yield a second weighted value; and and summing at least the first weighted value and the second weighted value to yield the composite fly height value.

18. The method of claim 13, wherein modifying the distance between the head assembly and the storage medium based at least in part on the composite fly height value is done after processing each sector of user data.

19. A storage device, the storage device comprising:

a storage medium including a first servo data region, a second servo data region, and a user data region disposed between the first servo data region and the second servo data region;

a read/write head assembly disposed in relation to the storage medium, wherein the read/write head assembly is operable to provide an electrical signal corresponding to the user data region;

an analog to digital converter circuit operable to convert a derivative of the electrical signal to a data set corresponding to the user data region; and a first pattern detector circuit operable to identify a first pattern in the data set;

a first pattern fly height calculation circuit operable to calculate a first fly height using data values corresponding to the first pattern to yield a first pattern fly height output;

a first averaging circuit operable to average the first pattern fly height output with other instances of the first fly height output to yield a first averaged output;

a second pattern detector circuit operable to identify a second pattern in the received data set;

a second pattern fly height calculation circuit operable to calculate a second fly height using data values corresponding to the second pattern to yield a second pattern fly height output;

a second averaging circuit operable to average the second pattern fly height output with other instances of the second pattern fly height output to yield a second averaged output;

a combining circuit operable to combine at least the first averaged output and the second averaged output to yield a composite fly height value; and a fly height adjustment circuit operable to modify a distance between the read/write head assembly and the storage medium based at least in part on the composite fly height value.

20. The storage device of claim 19, wherein the first pattern is selected from a group consisting of: a sync mark pattern, a preamble pattern, an end of sector pattern, and a predetermined pattern within a user data region.

* * * * *